Inventors;
William C. Dillon,
Clarence H. Kehm,
By Chritton, Schroeder, Merriam & Hofgren, Attys.

CARRIER WAVE COMMUNICATION SYSTEM

Filed June 6, 1946 7 Sheets-Sheet 2

Inventors:
William C. Dillon,
Clarence H. Kehm,
By Chritton, Schroeder, Merriam & Hofgren, Attys.

Dec. 26, 1950 W. C. DILLON ET AL 2,535,906

CARRIER WAVE COMMUNICATION SYSTEM

Filed June 6, 1946 7 Sheets-Sheet 3

Inventors:
William C. Dillon,
Clarence H. Kehm,
By Chritton, Schroeder, Merriam & Hofgren,
Attys.

Inventors:
William C. Dillon,
Clarence H. Kehm,
By Chritton, Schroeder, Merriam & Hofgren,
Attys.

Inventors:
William C. Dillon,
Clarence H. Kehm,
By Christon, Schroeder, Merriam & Hofgren, Attys.

Inventors:
William C. Dillon,
Clarence H. Kehm,
By Christon, Schroeder, Merriam & Hofgren,
Attys.

Inventors:
William C. Dillon,
Clarence H. Kehm,
By Chritton, Schroeder, Merriam & Hofgren,
Attys.

Patented Dec. 26, 1950 2,535,906

UNITED STATES PATENT OFFICE 2,535,906

CARRIER WAVE COMMUNICATION SYSTEM

William C. Dillon and Clarence H. Kehm, Chicago, Ill., assignors to W. C. Dillon & Co., Inc., Chicago, Ill., a corporation of Illinois Application June 6, 1946, Serial No. 674,750

20 Claims. (Cl. 179—15)

Figure 1:
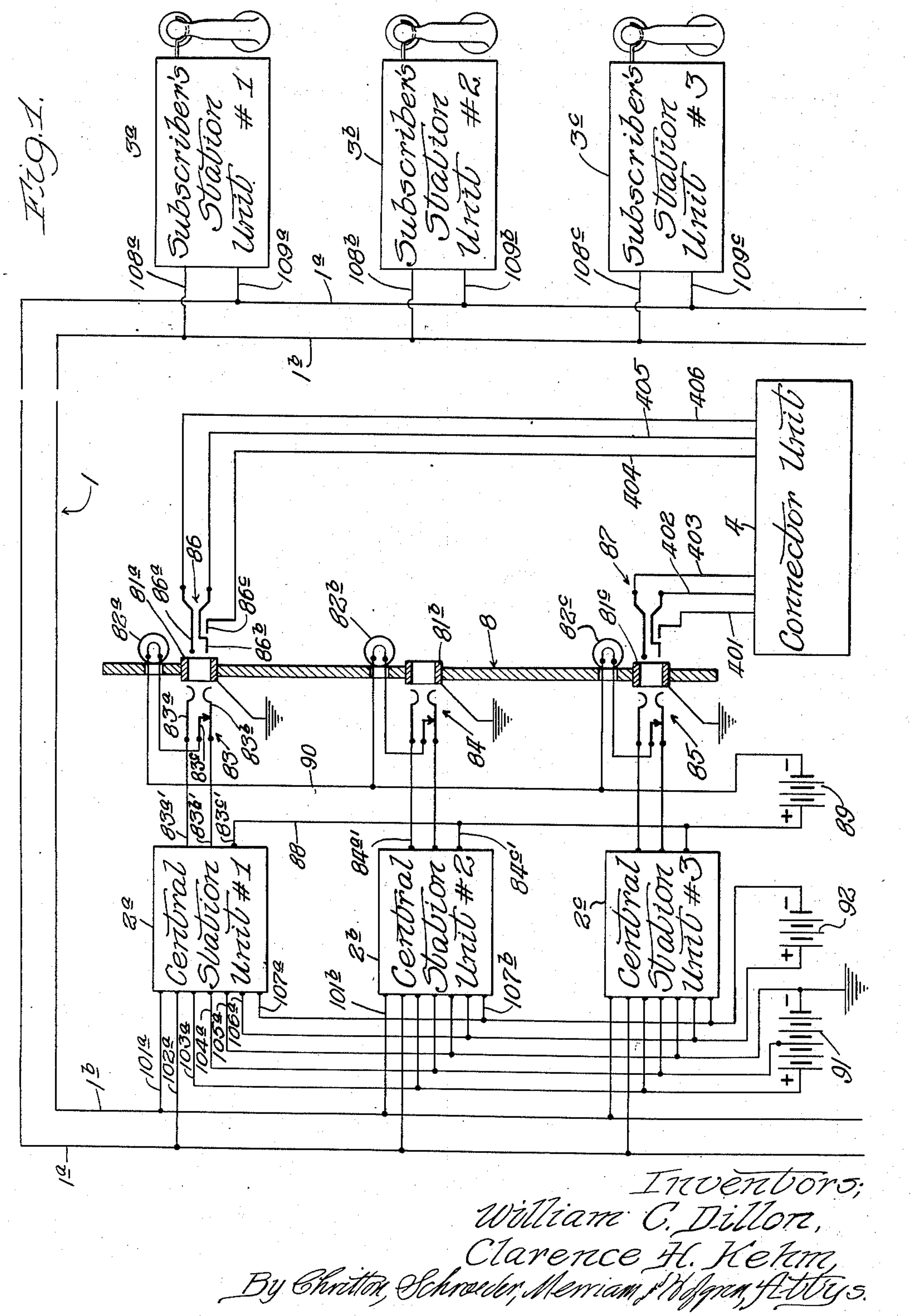

This invention relates to a communications system, and more particularly to a carrier telephone system providing a plurality of private communication channels over a single transmission line.

While carrier systems have heretofore been used on toll lines, all prior art carrier telephone systems known to us have been impractical for local lines in that they required complicated equipment and local power supplies at each end of the transmission line. While it may be practical to have multi-stage tube amplifiers and their associated power supplies in the central stations of two cities spaced several hundred miles apart, it is not practical to place multi-tube units requiring power supplies in the home of each subscriber on a local line, as the necessity for local power paid for by the subscriber rather than the telephone company would be an undesirable factor from the standpoint of public acceptance, and the servicing required by complicated electronic equipment would render the maintenance of such a local system practically prohibitive. This is particularly true of rural telephone circuits where a single circuit would normally have twenty or twenty-five subscribers spaced over quite a distance, the problem being further complicated by the fact that many rural areas have no source of commercial electric power.

We have devised a carrier telephone system which requires no tubes or other complicated electronic equipment at the subscriber's home and in which all of the electronic equipment is located in the central station and all of the power requirements of the system are supplied from that point. The result is a telephone system which is particularly adaptable for rural areas or small towns, and which provides the satisfactory service of a single party big city line while at the same time enabling a large number of subscribers, as for example twenty-five subscribers, to be connected to a conventional local circuit of the party-line type.

In addition to the provision of simple and rugged equipment at the subscriber's home, requiring no local power supply, and the providing of complete privacy of communication channels on a multi-party line, our system is further particularly advantageous in that it can be connected into a conventional telephone switchboard, the calls can be handled in conventional manner by the switchboard operator, and interconnections between subscribers on circuits employing our system and subscribers on the more conventional battery circuits, can be made without any special provisions being required. That is, a subscriber on a local line employing our carrier system can be connected to another subscriber on the same line, another subscriber on another carrier line local circuit, a subscriber in a town or city circuit on the conventional battery operated telephone line, or to a toll circuit by the conventional cord and plug operations, the signals on the board likewise being conventional in all phases of the operation.

Figure 2:
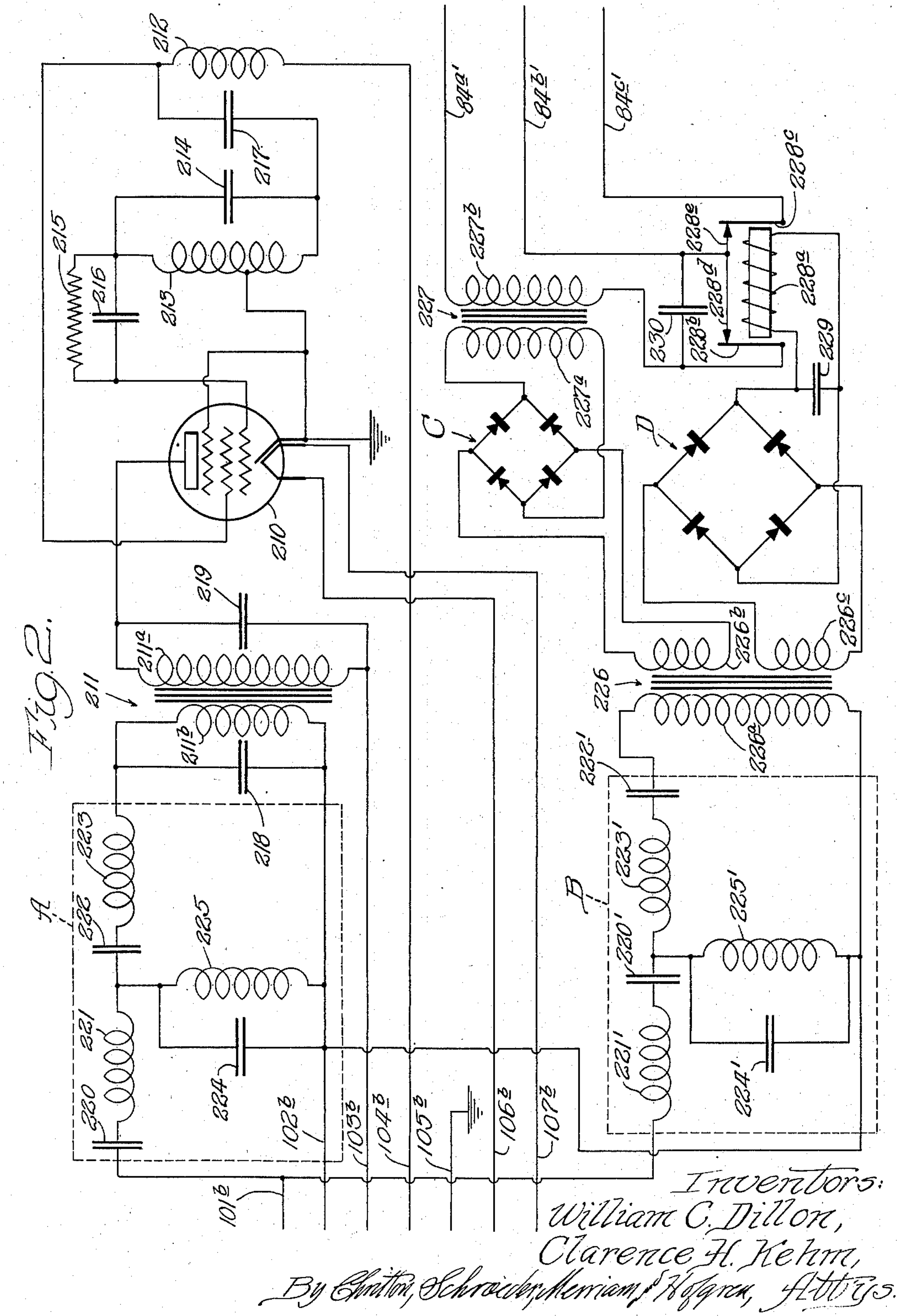
Figure 3:
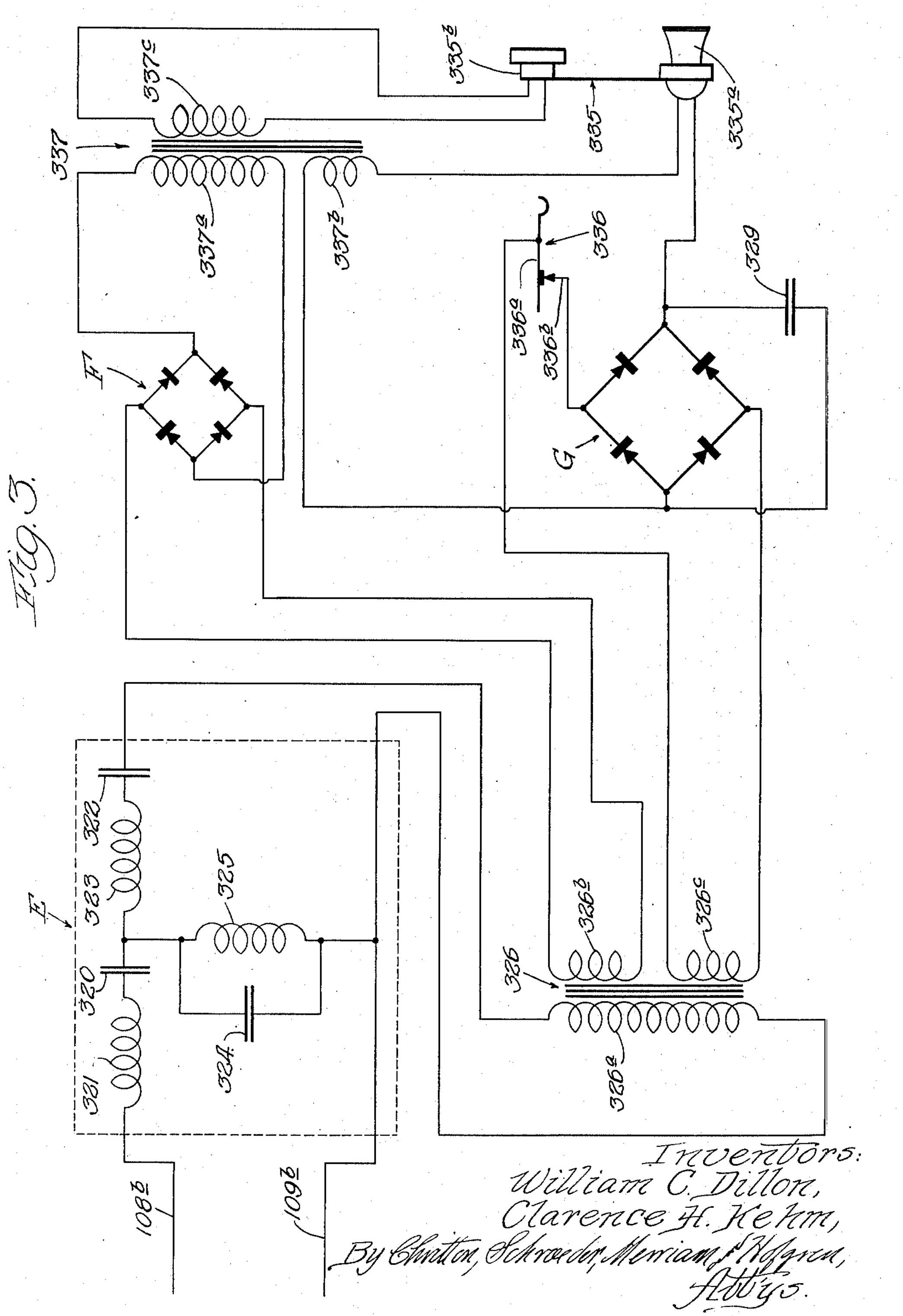
Figure 4:
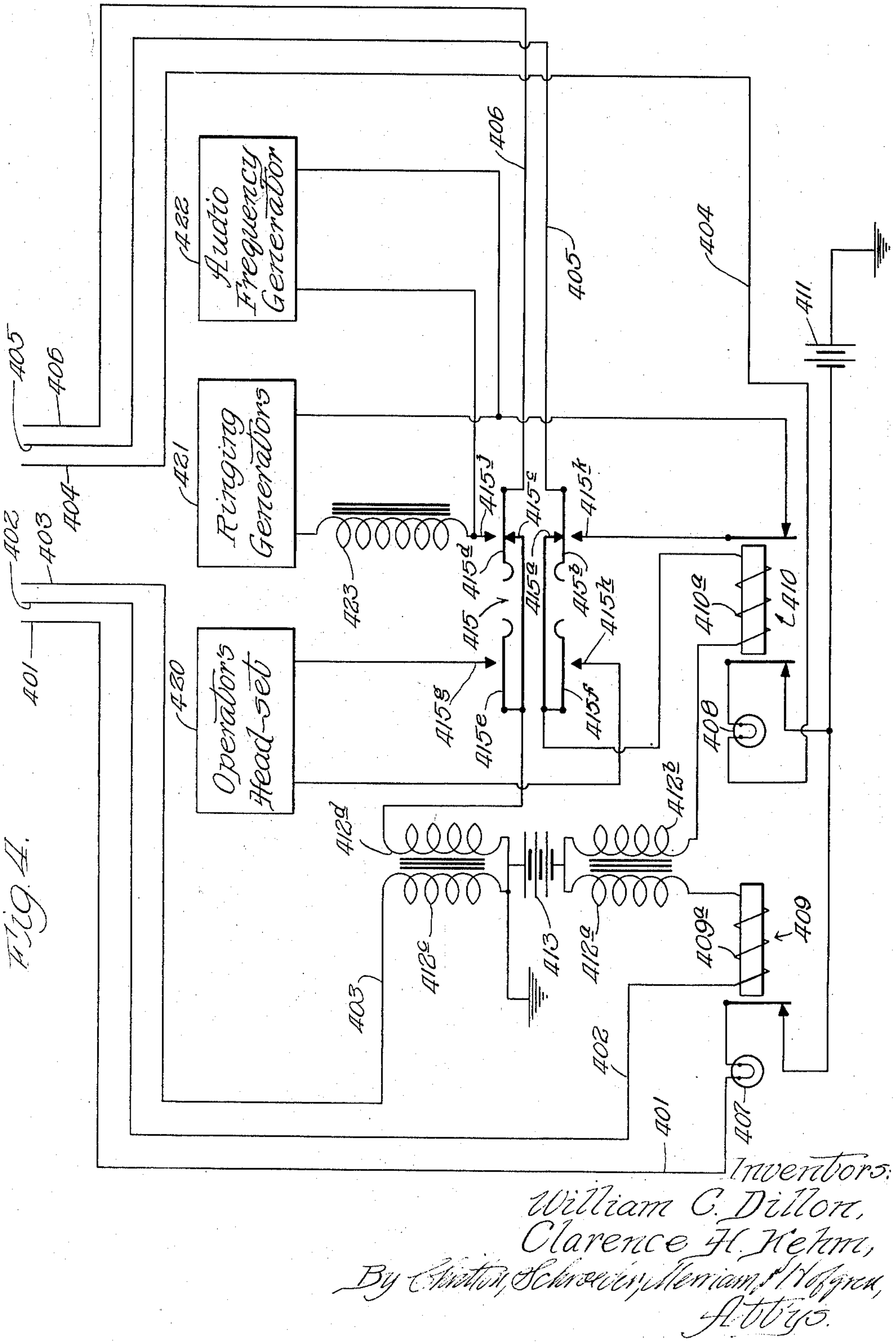
Figure 5:
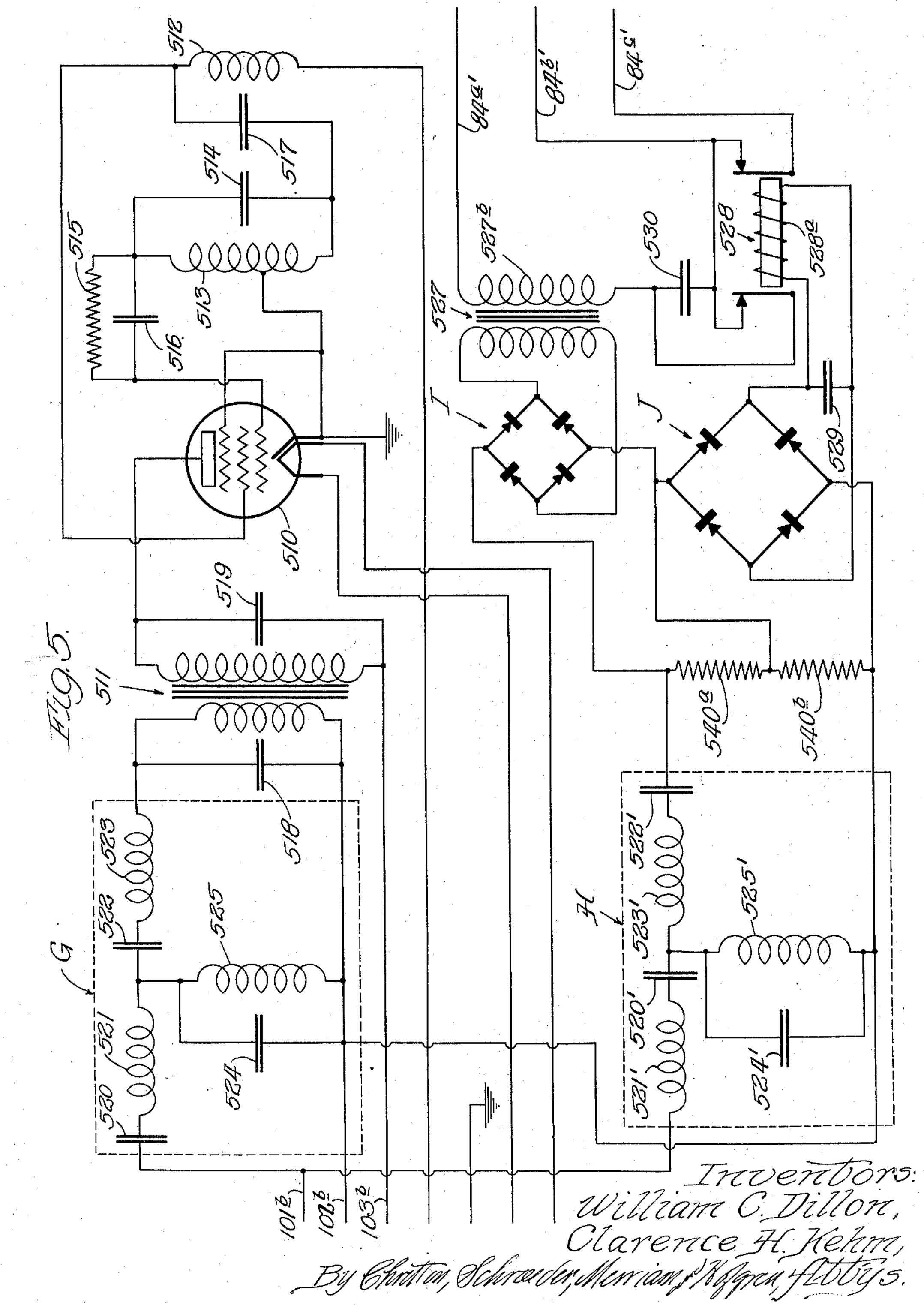
Figures 6, 8:
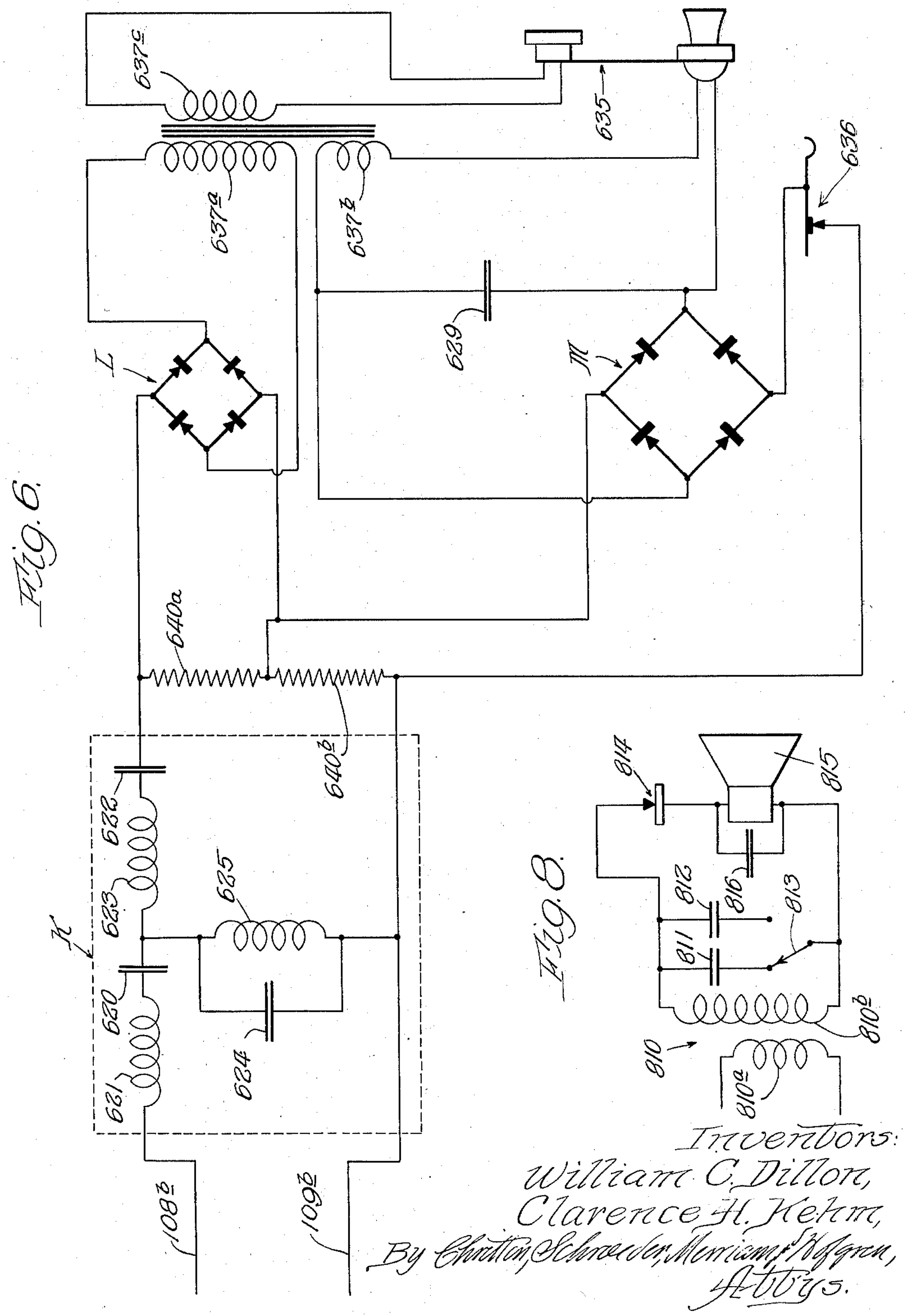
Figure 7:
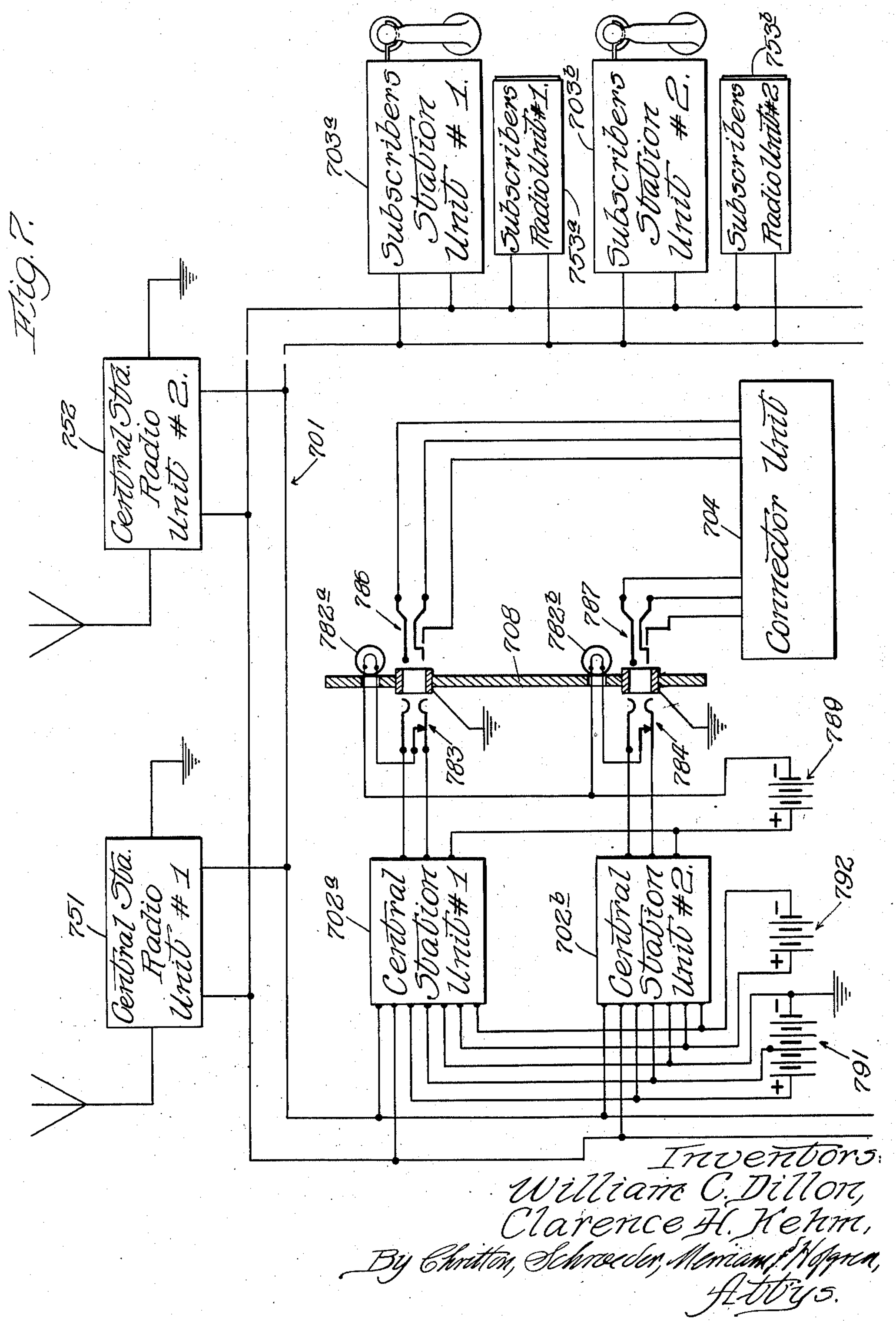

One feature of our invention, as mentioned heretofore is the provision of a plurality of private communication channels on a single multi-party line; another feature of our invention is the provision of a carrier telephony system for local circuits requiring no complicated electronic equipment and no local power supply in the subscriber's home; yet another feature of this invention is the provision of a signaling and ringing arrangement enabling the operator, through the same operation at the switchboard, to signal a subscriber on one of our carrier circuits or on a conventional battery circuit; still another feature of this invention is that lifting of the receiver at the subscriber's unit operates a relay at the switchboard to provide a signaling indication even though there is no battery current on the line and the subscriber's receiver hook switch is indirectly connected to the line, as through a transformer, rather than being directly connected to the transmission line; a further feature of this invention is the provision of means in the subscriber's unit for rectifying a portion of the carrier waves for providing a direct current supply for operating a conventional microphone of the type generally used in telephone systems; still a further feature of our invention is effecting signaling of the subscriber by utilizing a signaling frequency to which the receiver diaphragm is resonant; yet a further feature of our invention is the use of a special induction coil with three windings for providing optimum conditions for both microphone and receiver operation; and still another feature of our invention is that the telephone circuit is particularly adapted to carry several wired radio channels providing the farmer with radio entertainment without the necessity of his having a local power source for operations his own radio receiver. Other features and advantages of this invention will be apparent from the following specification and the drawings, in which:

Figure 1 is a schematic diagram of a portion of a system embodying our inventions, the three central station units and subscriber's units illustrated being merely representative of the very much larger number of units which would ordinarily be associated with each transmission line or circuit; Figure 2 is a circuit diagram illustrating one form of central station unit which may be used; Figure 3 is a circuit diagram of a form of subscriber's station unit which might be used in conjunction with central station units of the character shown in Figure 2 in a system of the kind shown in Figure 1; Figure 4 is a circuit diagram of a connector unit for the system shown in Figure 1; Figure 5 is a circuit diagram of another form of central station unit which may be used in the system shown in Figure 1; Figure 6 is a circuit diagram of a subscriber's station unit which may be used in conjunction with central station units of the character shown in Figure 5; Figure 7 is a schematic diagram analogous to Figure 1 but including radio service in addition to telephone service; and Figure 8 is a circuit diagram of a subscriber's radio unit.

Before entering upon a detailed description of our system, with references of the drawings, it is felt desirable to briefly describe our system and its operation in general terms.

In a telephone circuit making use of our invention, as for example a rural party line circuit, the central station includes what we are terming a central station unit for each subscriber on the line, as for example each of twenty-five subscribers. The central station units each contain means for continuously supplying carrier waves to the line, as an oscillator, each unit providing carrier waves of a predetermined different frequency; and in addition each unit includes filter means, rectifying means, and modulator-demodulator means. Each subscriber's unit includes filter means, modulator-demodulator means, rectifying means, an induction coil, and the receiver and microphone. The equipment required at the subscriber's station is of such a character that the microphone and receiver may be combined in a hand set of a cradle phone unit and all of the other parts may be incorporated in the base of such a unit. The connector unit associated with the cords at the switchboard must contain, in addition to the conventional cam switches, relays, and the like, our special combined ringing and signaling arrangement.

We prefer to employ carrier waves of predetermined spaced frequencies starting immediately above audible range, as for example at 19 000 cycles per second. As the voice frequencies used in telephone circuits practically never exceed 2,000 cycles per second and are normally of the order of 1,000 cycles per second or lower, the spacing between carrier channels need not be great even if both sidebands are associated with the carriers, it having been our experience that 4,000 cycles spacing between carriers is very satisfactory. For example, the carrier supply or generating means associated with central station unit No. 1 may provide carrier waves having a frequency of 19,000 cycles per second, and the filters of central station unit No. 1 would both be tuned to this same frequency and adapted to pass at least 1,000 cycles on each side of this center frequency while providing considerable attenuation of frequencies several thousand cycles away. The carrier supplying means associated with central station unit No. 2 might provide carrier waves of a frequency of 23 000 cycles per second, and the filters of this unit and the corresponding subscriber's unit would be tuned to this same frequency. The central station and subscriber's unit No. 3 might be designed to operate at 27,000 cycles per second; and other units on the same line might operate at different predetermined similarly spaced frequencies.

When subscriber No. 1 lifts his receiver closing of the switch means resulting from this action operates the indicator lamp on the switchboard associated with central station unit No. 1, lifting of the receiver effecting variation in the condition in the transmission line, as its effective inductance, which operates only through central station unit No. 1 because this is the only unit tuned to the frequency affected by anything in subscriber's unit No. 1. When the operator plugs into the jack on the switchboard associated with central station No. 1 the light goes out, in conventional manner, and conversation can then be carried on between subscriber No. 1 and the operator by modulating and demodulating the 19,000 cycle carrier wave, the conversation being private since this frequency will not actuate any other subscriber's unit, all of the other units on the line having their filters tuned to other frequencies. When the subscriber has indicated whom he wishes to reach, the operator would then plug the corresponding cord into a jack on another similar carrier circuit, the same circuit, a battery operated circuit in the town in which the central station is located, or a toll circuit, as may be desired. If the party desired is on the same or another circuit within the same operator's jurisdiction, she would then ring or signal the other party and close her keys to permit the conversation to take place.

If subscriber No. 1 wished to talk to subscriber No. 3 on the same line, for example, voice waves at the microphone of subscriber No. 1 would modulate the 19,000 cycle carrier, would travel along to central station unit No. 1 at this carrier frequency, would be demodulated there, would pass through the jacks, cords, and connectors unit at voice frequency, would modulate the 27,000 cycle carrier at central station unit No. 3, and then travel back along the transmission line to subscriber's station unit No. 3, where they would be demodulated and actuate the receiver at this unit. When subscriber No. 3 spoke into his mouthpiece the reverse would take place, the waves first traveling along the transmission line as a modulation effect on a 27,000 cycle carrier and then returning to subscriber No. 1 as a modulation effect on a 19,000 cycle carrier. On the other hand, if subscriber No. 1 were talking to a shopkeeper in town on a conventional battery circuit this subscriber's voice waves would travel in to the central station as modulation effects on his 19000 cycle carrier, would be demodulated in central station unit No. 1, and would then travel at voice frequencies through the board and the battery circuit in town to the shopkeeper's ears, the reverse being true when the shopkeeper spoke.

Inasmuch as conventional ringing operations are not feasible on a carrier system, we prefer to signal the subscribers on a telephone circuit employing our system by vibrating the receiver diaphragm at its frequency of mechanical resonance to set up a "howling" which may be made even louder than a more conventional bell if desired. While different receivers may have diaphragms with different frequencies of mechanical resonance, we prefer to use receivers of a single make and type all having substantially identical resonant frequencies, as for example, 400 vibrations per second. We then parallel the conventional ringing generator at the central station with a 400 cycle generator (providing suitable choke means to prevent these generators from shorting each other), so that when the operator opens the ringing key both the conventional ringing frequency (as for example 16 or 32 cycles per second) and the "howling" frequency (as for example 400 cycles per second) go on to the line. The "howling" frequency should preferably be different than the natural frequency of the receivers on battery circuits operated from the same central station, so that the conventional bell ringing will take place on these circuits; whereas on the carrier circuits utilizing our inventions the very low bell ringing frequency will effect no action whatsoever at any of the subscriber's stations, and the "howling" signal will vibrate the receiver diaphragm only at the station tuned to the carrier frequency associated with the central station unit through which the call is being completed, making signaling as well as communication private even though a single pair of wires providing the party line may have as many as twenty-five or thirty subscribers connected thereto.

Referring first more particularly to Figure 1, the particular embodiment of our invention illustrated here is shown as comprising a transmission line 1, a plurality of central station units 2a, 2b, 2c, etc., a plurality of subscriber's station units 3a, 3b, 3c, etc. and substantially conventional connector unit No. 4 and switchboard 8. The central station units would all be identical except for the frequencies to which they would be tuned, and the two forms of suitable central station units are illustrated in Figures 2 and 5 and will be more fully described hereafter. The subscriber's station units would also be identical except for the frequencies at which they were designed to operate, and representative subscriber's station units are illustrated in detail in Figures 3 and 6 and will be described more fully hereafter. Figures 2 and 3 illustrate central station and subscriber's station units adapted to operate in a system effecting indication on the central station switchboard by a change of circuit conditions between resonance and non-resonance; and Figures 5 and 6 illustrate central station and subscriber's station units adapted to effect the desired indication at the central station switchboard by a change of load conditions on the line. The transmission line 1 might be a conventional rural party line comprising a pair of wires stretching across the countryside, preferably twisted every post or so to minimize interference. While such wires may be brought clear into the central station if local interference is low, we prefer to have the portion of the line close to the central station in the form of a co-axial cable. Normally each such circuit or transmission line would have twenty or twenty-five, or possibly even thirty or more subscribers connected thereto, the three units illustrated in each case in Figure 1 being representative of the larger number which would be used in practice.

It will also be understood, of course, that the central station of a telephone system embodying our invention on its rural lines might also have conventional battery operated telephone circuits in the town handled from the same or adjacent boards; and toll line circuits leading to other cities, either of the battery or carrier type.

The switchboard 8 would be of conventional type, with a plurality of jack openings with grounded rings therearound, as the rings 81a, 81b, 81c, etc., and associated indicating means in the form of conventional switchboard lamps 82a, 82b, 82c, etc. Associated with the openings would be a plurality of conventional jacks 83, 84 and 85 adapted to receive plugs, as the plugs 86 and 87 of a cord set. Inasmuch as the jacks and plugs are conventional, only one of each will be described in more detail.

Referring now more particularly to the jack 83 and the plug 86, it will be seen that the jack has spring terminals 83a and 83b adapted to be contacted by the tip and ring portions 86a and 86b, respectively, of the plug. The plug is provided with a conventional barrel or body portion 86c adapted to engage the grounded ring 81a; and the jack contains a terminal or contact member 83c separated from the contact 83b by insertion of the plug. The contacts 83a and 83b are connected to central unit No. 1 by wires 83a' and 83b', respectively; and a wire 83c' leads from central unit No. 1 and is connected to the contact 83c through a bus wire 88, the pilot light power supply battery 89, the bus wire 90, and the indicating lamp 82a.

Similar connections to the other units are made between these bus wires and the appropriate jacks and indicating lamps.

Each central station unit is connected to the two wires 1a and 1b of the transmission line by appropriate connections, as the connections 101a and 102a, for example. Conventional local sources of central station power, here indicated as batteries 91 and 92, provide anode, screen grid, and filament supply power, bus wires from appropriate terminals of these sources being connected to each unit, as through the connecting wires 103a, 104a, 105a, 106a, and 107a, the other units all having corresponding connecting wires.

Referring now more particularly to Figure 2, a representative central station unit (as unit No. 2) designed to embody one form of carrier telephony embodying our inventions, will be described in more detail.

The source of continuous carrier waves of a desired frequency, as for example 23,000 cycles, is here illustrated as provided by an oscillator which employs a suitable tube 210, as one of tube type No. 6L6, associated tuned circuits and connections. The tube is supplied with heater current through the filament supply leads 106b and 107b, and the cathode is grounded to the frame of the unit and to the common ground through the lead 105b. Plate supply voltage is delivered from the lead 103b through the winding 211a of the coupling transformer 211 to the anode of the tube 210; and screen grid voltage is supplied from the lead 104b through the choke 212. The tube elements are coupled to a tank circuit comprising the coil 213 and main condenser 214 in parallel. A grid leak resistor 215 and condenser 216, and a by-pass condenser 217, complete the oscillator circuit illustrated; and the windings 211a and 211b of the coupling transformer are preferably tuned by the shunt condensers 218 and 219.

The output of the continuously operating oscillator is delivered to the connecting wires 101b and 102b, and thus to the transmission line, through a filter here shown as comprising a condenser 220, an inductance 221, another condenser 222, and another inductance 223 all in series with each other; and a shunt path connected between the wire 102b and a point between the coil 221 and condenser 222, this path comprising the condenser 224 and coil 225 in parallel.

For an oscillator adapted to operate at the representative value of 23,000 cycles with the particular tube type mentioned, the coils 212 and 213 might have inductances of 30 millihenrys and 20 millihenrys respectively; the condensers 214, 216, 217 capacities of .0025, .001, and .05 microfarad; and the grid leak resistor 215 a value of 10,000 ohms. The coupling transformer windings 211*a* and 211*b* might have inductances of 24 and 3.8 millihenrys each, and be shunted by condensers 218 and 219 of .014 and .0015 microfarad each. The filter section should readily pass the particular predetermined carrier frequency, as 23,000 cycles, and about 1,000 cycles on each side, but have substantial attentuation for frequencies differing from the desired pass band, to avoid interference or shunting action between the various continuously operating carrier wave sources. We have found a satisfactory filter for the 23,000 cycle carrier unit being described as representative may have condensers 220 and 222 with a capacity of .0013 microfarad each, and a condenser 224 with a capacity of .31 microfarad; and coils 221 and 223 with an inductance of 39.8 millihenrys each, and a coil 225 with an inductance of .15 millihenry.

Another filter section B in the unit serves to make connection between the transmission line and the modulator-demodulator and rectifying units to be described shortly hereafter, this second filter section being here shown as comprising condensers 220′, 222′ and 224′, and coils 221′, 223′, and 225′, these corresponding in all respects to the elements of the first described filter A.

Connection is made from the just described filter B to the winding 266*a* of the load coil or transformer 226 having the additional windings 226*b* and 226*c*. In the particular unit being described, the winding 226*a* may have a value of 3.8 millihenrys and the windings 226*b* and 226*c* inductances of 2.2 and 15 millihenrys each.

These windings are connected to two opposite corners or terminals of dry-plate diamond-connected rectifier arrangements here identified in general as C and D, thus providing arrangements operative for the desired purposes and requiring no local source of power, a factor of considerable importance in the subscriber's station units to be hereafter more fully described. The unit C is indicated as being somewhat smaller than the unit D as representative of the fact that the power capacity of the unit D, and thus its size, normally should be several times that of the unit C.

The unit C operates as a modulator-demodulator unit in accordance with well known principles, sometimes being termed a "varistor." By having two of its opposite corners connected to the winding 226*b* and its two other opposite corners or terminals connected to the winding 227*a* of the induction coil 227 having its other winding 227*b* connected to the wires 84*a*′ and 84*b*′ leading to the jack 84, the unit operates as a demodulator to convert the modulation waves of a 23,000 cycle modulated carrier wave reaching the transformer 226 into voice waves, or waves at voice frequency to be delivered to the contacts 84*a* and 84*b* of the jack 84. Conversely, voice waves passing through the cord set and connector unit and being applied to the winding 227 reflect a load variation, and thus an impedance variation, back onto the carrier waves existing in the coil 226*a*, and thus by what is in effect a varation of secondary load, serving to modulate the carrier waves supplied to the transmission line.

The other dry-plate diamond-connected arrangement D serves solely as a rectifier, rectifying a portion of the carrier wave energy to provide direct current energization for a conventional telephone type relay here shown as having a winding 228*a*, movable contact members 228*b* and 228*c*, and associated fixed contacts 228*d* and 228*e*. Any A. C. currents which might otherwise be present in the winding 228*a* are by-passed through the condenser 229, which may have a value of 25 microfarads; and an alternating current path is provided at all times between the wire 84*b*′ and one end of the winding 227*b* by the condenser 230, which may have a value of 2 microfarads.

Referring next to the subscriber's station units, and more particularly to Figures 1 and 3, it will be seen that each of these units is connected to the transmission line by suitable connecting wires, as the wires 108*a* and 109*a* for the unit 3*a*, etc. Each subscriber's station unit includes a conventional microphone or telephone transmitter and receiver, which may be combined in a single unit of the cradle type. Such a unit is supported by switch means when in the inoperative position, as illustrated schematically in Figure 1, and the remaining parts of the subscriber's unit are of a size and type which may be readily built into the base of a conventional cradle phone installation to provide a modern uniit at the subscriber's end.

Referring now more particularly to Figure 3, and describing a representative subscriber's station unit (as subscriber's station unit No. 2 cooperating with central station unit No. 2 heretofore described), the receiver-transmitter unit is here identified in general as 335, and comprises a transmitter or microphone 335*a* (which may be of the conventional carbon button type with a relatively quite low impedance) and a receiver here identified as 335*b*, which may be of conventional type and which would preferably have an impedance of several hundred ohms. The switch means constituting the support for the receiver-transmitter set 335 is here indicated in general as 336, comprising a movable member 336*a* serving as the support and carrying the movable contact adapted to engage the fixed contact 336*b* or to be separated therefrom, the contacts being shown closed as though the telephone equipment now being described were in use.

Connection to the connecting wires 108*b* and 109*b*, and thus to the transmission line, is through a filter E here shown as comprising condensers 320, 322, and 324 and cooperating inductances 321, 323, and 325. Inasmuch as this filter is here illustrated as being identical with the filter section A in the central station unit, analogous numerals are being used and this filter will not be described in more detail. It would be tuned, of course, to the same predetermined frequency to which the filters and oscillator of its corresponding central station unit are tuned, which frequency would be different from that of any of the other carrier frequencies employed.

The other side of the filter in the subscriber's station is connected to a winding of a coupling means or transformer, this winding being identified as 326*a* and being shown as inductively coupled to other windings. One of these, here identified as the winding 326*b*, is shown as connected to a pair of opposite corners or terminals of a dry-plate diamond-connected arrangement identified in general as F, this unit having its other corners or pair of terminals connected to the winding 337*a* of the induction coil or coupling means 337. This unit F serves as a modulator-demodulator unit, and is analogous to the unit C in the corresponding central station unit. The other winding 326c of the transformer 326 has one side connected to one corner of the dry-plate diamond-connected rectifying arrangement here indicated in general as G, the opposite corner or terminal being connected through the switch means 336 to the other side of the winding 326c, so that this circuit is completed only when the hand set 335 is off the support provided by the switch means. The other pair of terminals of the rectifying means G, the direct current terminals, are connected to a circuit having the winding 337b and the carbon button of the microphone 335a in series. It will thus be apparent that whenever the hand set 335 is picked up the switch means completes a circuit to the microphone and a portion of the carrier waves passing through the filter E are rectified and provide a D. C. source of energizing current for the microphone. Since the modulator-demodulator unit F and the rectifying unit G are of a character requiring no local power supply, and since the rectifying means converts part of the carrier wave power originally at the central station into power usable to energize the microphone, no local power supply of any kind is necessary in connection with the subscriber's telephone equipment; that is, the subscriber need not have commercial power in his home, nor does either he or the telephone company have to provide battery power.

The receiver 335b is connected in an independent circuit to the winding 337c, so that modulated carrier waves passing through the filter E and demodulated by the unit F serve to vibrate the diaphragm of the receiver in the desired pattern. All receivers are preferably of a single predetermined type so that the period of mechanical resonance of the receiver diaphragm is at some predetermined frequency in the audible range, as for example 400 cycles per second. The mechanical resonance is not so great as to undesirably distort voice waves, but it does provide a predetermined frequency at which the receiver can be made to "howl" for signaling the subscriber, in lieu of ringing a bell. The provision of three windings on the transformer 337 is of considerable importance, as it enables the widely differing impedances of the output of the modulator-demodulator unit F, the microphone 335a, and the receiver 335b to be individually matched for most efficient operation. Sound waves reaching the diaphragm of the microphone 335a, when this particular subscriber is speaking into it, varies the resistance of the carbon button in conventional manner and thus varies the amount of current in the microphone circuit to set up electrical voice waves corresponding to the sound waves. The transformer action between windings 337a and 337b transfers these voice waves to the one pair of terminals to the modulator-demodulator unit F, resulting in reflecting back an effective resistance change causing substantial effective load variations in the winding 326b to effect modulation of the carrier waves present in the winding 326a; and this modulation action is aided by the variation in current drawn from the rectifying means G, reflected back to the winding 326c. The result is that the particular carrier wave present in the winding 326a (which would be a 23,000 cycle wave under the conditions described as representative) would be modulated, while no other carrier waves present on the transmission line would be affected, the filter E providing isolation from these other carriers.

While the central station and subscriber's units just described as representative of one embodiment of our invention have been illustrated as employing a tube oscillator arrangement, inductive-capacitative filters, modulator-demodulator and rectifying means of the conventional copper oxide type, as making use of a cradle phone, and the like, it will be understood that these are merely illustrative of one method of accomplishing our improved operation. The tube oscillator could be replaced by a motor generator arrangement or any other means of providing carrier waves of the desired frequency; the filters can be of crystal or other suitable types, the rectifying means could be a cold cathode tube or other appropriate means requiring no local power supply, the switch means can be manually operated if desired, etc.

Referring now more particularly to Figure 4, a connector unit adapted to be associated with a pair of conventional switchboard cords and to make connection between two stations will be described, the description being kept brief inasmuch as the connector unit is conventional with the exception of our special signaling or calling arrangement. Wires 401, 402 and 403 are here shown as connected to the shell, ring and tip, respectively, of plug 87 of a pair of cords, the corresponding plug 86 having the wires 404, 405 and 406 connected thereto. Wires 401 and 404 are each connected to one side of the signal lamps 407 and 408 associated with the cords at the base of the switchboard, an energizing circuit for these lamps being completed through the contacts of relays 409 and 410, respectively, and a common battery 411 to ground, so that these lamps are illuminated when the plugs are in and the relays are deenergized. The energization coil 409a of the relay 409 has one side connected to the wire 402 and the other side connected through a winding 412a of the repeater coil 412 and a common battery 413 to ground, the repeater coil permitting the use of a common battery for several circuits without interference in accordance with conventional telephone practice. The other winding 412b of the repeater coil is connected to one side of the winding 410a of the relay 410, the other side of this relay being connected to the contact 415a of switch 415 of conventional switchboard type, a circuit being closed from this element 415a, when the key is in central or neutral position, to the element 415b and thus to the cord wire 405. Cord wide 403 is connected to winding 412c of the repeater coil, the other winding 412d of this coil being connected to another element 415c of the cam switch, this element normally being in contact with the element 415d to complete a circuit through the other cord wire 406.

Movement of the cam switch in one direction, in accordance with conventional practice, effects engagement of the movable contact members 415e and 415f with the closed contacts 415g and 415h to place the operator's headset 420 (i. e., microphone and receiver) in circuit with the wires 403 and 406 on the one hand and 402 and 405 on the other hand, so that the operator may speak with the subscriber on either cord. On the other hand, movement of the cam switch in the other direction separates the contact elements 415b and 415d from the contacts 415a and 415c and brings them into engagement with the contacts 415j and 415k to effect signaling to the subscriber connected to cord wires 405 and 406, the plug connected to the cord wires 404, 405 and 406 being the calling plug and the other plug being the answering plug when a light first comes up on the switchboard.

The signaling means which we provide to enable the operator to handle calls on our telephone circuits or on conventional circuits without any difference in procedure comprises a conventional ringing generator 421 and an additional audio frequency generator 422 in parallel therewith. The conventional ringing generator would provide waves at a subaudible frequency (usually in the range of 16 to 32 cycles per second) adapted to ring the bell in the home of a subscriber on a conventional battery telephone circuit. The audio frequency generator 422 should provide waves of considerable power at the predetermined resonant frequency of the receivers in subscriber's stations embodying our inventions, as 400 cycles per second in the particular example described. This generator may comprise a tuning fork electrically driven and having its waves amplified by a conventional tube amplifier, a motor generator set providing waves of this frequency, or any other suitable source, the audio frequency generator 422 preferably being of relatively high impedance, as the output circuit of a tuning fork actuated amplifier mentioned above. The ringing generator 421, on the other hand, would be a very low impedance, and we prevent shorting out of these generators with respect to each other by deliberately making the audio frequency generator 422 of such high impedance as not to provide a short on the output of the ringing generator 421, and by putting an audio frequency choke 423 in one lead of the ringing generator, this providing high impedance to the waves of the generator 422 while passing the waves of the generator 421 readily. By this dual arrangement the operator may plug in the plug 86 on a jack connected to one of our carrier lines or to a conventional telephone circuit connected to the same or to an adjoining section of the switchboard and push the cam switch forward to effect signaling or calling on either line, the bell being rung on a conventional circuit and the receiver being vibrated at resonance on one of our carrier systems.

While the condensers in the subscriber's station units and central station units illustrated and described as representative are indicated schematically as fixed condensers inasmuch as they operate as fixed condensers, it will be understood that in practice some or all of these condensers, particularly those associated with the filters and coupling transformers, are provided with variable trimmer condensers or made partially variable for initial adjustment. Not only must the filter be adjusted to the desired carrier wave frequencies as part of the initial stages of production, or during installation, but also the entire transmission line and any particular pair of cooperating units are so tuned (this sometimes requiring an additional variable condenser across the two wires of the transmission line) that the whole circuit is resonant to the particular carrier frequency of those units when the hand set is picked up at the subscriber's end; and non-resonant when the switch 336 is open by reason of the hand set being in place on the base, at least in the system now first being described. In this system the non-resonant conditions existing whenever communication is to be provided between a particular pair of cooperating units results in relatively low amplitude carrier waves of this particular carrier frequency. On the other hand, for example, if the subscriber at station No. 3 picks up his hand set the closing of his switch sets up resonant conditions for his particular carrier frequency, 27,000 cycles in the particular example mentioned earlier, and carrier waves of this frequency immediately assume much greater amplitude on the line. Inasmuch as the filter of central station unit No. 3 is the only one which passes these particular carrier waves, only this central station unit is affected by this change in carrier wave amplitude. However, in central station unit No. 3 the relay 228, which has had its contacts open, is energized with sufficient power to cause closing of its contacts, this resulting in illumination of the indicating lamp 82c on the switchboard. That is, the relay 228 is made of a sensitivity such that its contacts are opened when the carrier waves to which this unit responds are at the lower amplitude associated with non-resonance to this particular frequency; and such that its contacts close when the carrier waves reach the higher amplitude associated with resonant conditions. The operator would then insert the answering plug 87 in the jack associated with the lamp 82c, this immediately breaking the circuit of this indicating lamp, transferring the indication to the lamp 407. The operator would then throw her headset in by the cam switch and determine the call which subscriber No. 3 desired to complete, the conversation taking place by modulation and demodulation of the 27,000 cycle carrier, as described heretofore, so that the communication is completely private. If it be assumed that subscriber No. 3 desired to talk to subscriber No. 1, the operator would then insert plug 86 in jack 83 and throw the ringing key forward to effect vibration of the receiver diaphragm at subscriber's station No. 1. While central station unit No. 1 and associated transmission line would not be resonant to the 19,000 cycle carrier associated with unit No. 1 under these conditions, since the hand set of subscriber No. 1 is still in place and the switch open, plenty of power for effecting a loud audible indication can be achieved by having the audible frequency generator 422 of sufficient power to effect a very high percentage of modulation of carrier No. 1, as 80% or 90% modulation. When subscriber No. 1 responds to the signal and picks up his handset the baseboard indicating lights associated with the switchboard and the particular pair of cords being used are extinguished in the conventional manner by energization of the connector unit relays, and the conversation then proceeds in the manner which has heretofore been described, both carrier wave No. 1 and carrier wave No. 3 being utilized, with demodulation from one of these waves and modulation upon the other taking place at the central station, depending on which subscriber is speaking.

As has been mentioned heretofore, subscriber No. 3 can then connect with equal ease to a conventional battery telephone circuit or to a toll line. When either subscriber hangs up the change of conditions associated with his carrier wave from resonance to non-resonance reduces the amplitude of the waves in his central station unit and this results in opening of the relay 228, this in turn deenergizing one of the connector unit relays 409 or 410 (depending upon which subscriber hangs up first) and illumination of the associated indicator lamp, calling the operator's attention to the fact that one or both of the cords should be pulled out.

While the system just described makes use of change of circuit conditions between resonance and non-resonance for effecting variations in the actuating relay for the indicating lamp, our system may be operated if desired without any relation to resonant conditions. Figures 5 and 6 illustrate central station and subscriber's station units in a system effecting the desired indication by change in load conditions, but without resonance at any time, and this other embodiment of our invention will be described with particular reference to these two figures. In order to keep the description brief but fully understandable, analogous parts will be given analogous reference numerals, except that the first numeral in each case will be that of one of the figures here being described rather than that of Figures 2 and 3 to which they are analogous.

Referring first more particularly to Figure 5, filter sections G and H are again shown as of the capacitative-reactive type, analogous to filters A and B, and would be tuned to the predetermined carrier frequency of this unit, as for example, 23,000 cycles. An oscillator again comprises the tube 510, the associated tank circuit comprising a coil 513 and condenser 514, and associated circuit elements such as the choke 512, the by-pass condenser 517, and the grid leak resistor 515, and condenser 516. This would again comprise the wave generator of the predetermined frequency (as 23,000 cycles), and would be coupled to the filter G by the tuned transformer 511 having its windings shunted by the condensers 518 and 519.

A portion of the carrier wave of the frequency of this particular unit is again applied to the filter H and through it to the modulator-demodulator unit I and the rectifying unit J. As before, the modulator-demodulator means is connected through a coupling means or transformer 527 to the two main contacts of the jack associated with this unit; and the rectifying means J is connected to the energizing coil 528a of a double relay 528 serving to control the indicating lamp associated with the corresponding jack on the switchboard, and to transfer indication to the cord lights when appropriate.

The difference between the unit shown in Figure 5 and that shown and described in some detail in Figure 2 resides primarily in the coupling means between the lower filter section and the units I and J. In the unit now being described the right hand end of the filter section H (speaking with respect to the positions as viewed in Figure 5) is connected to a coupling resistor 540 comprising the upper section 540a and the lower section 540b, a suitable value for these being 1,000 ohms each to provide a total coupling resistance of 2,000 ohms. As will be apparent from a glance at the circuit diagram of Figure 5, one-half of the output voltage existing across the filter H at any particular time is applied to the modulator-demodulator unit I, and the other one-half to the rectifying unit J. The second difference between the unit here being described and that shown in Figure 2 and described earlier resides in the arrangement of contacts of the relay 528, this relay being so arranged that its contacts are normally closed and are opened by energization of the coil 528a above a certain level of energy, as distinguished from the relay 228 where the contacts were closed by increase in the current flow through the energizing coil.

Referring now more particularly to Figure 6, a circuit diagram of a subscriber's station unit of the non-resonant type, it will be seen that the filter section K (analogous to the filter section E of the unit shown in Figure 3 and described earlier) has its output voltage developed across a coupling resistor comprising the sections 640a and 640b, a suitable value for these sections being 1,000 ohms each. The voltage developed across the upper section 640a is connected to two of the terminals of the modulator-demodulator unit L, and through this to the receiver of the hand set 635; and the lower section 640b has its terminals connected to opposite terminals of the rectifying unit M (one of such connections being through the switch means 636) to energize the microphone of the hand set.

In this form of our invention the energizing levels provided by the carrier wave supplying means are made sufficiently high that the portion supplied to the rectifying means J in the central station unit, when the hand set of the corresponding subscriber is on the hook 636, is sufficient to provide a minimum of five milliamperes of current through the actuating coil 528a of the relay 528, this being sufficient (in a conventional relay of the type frequently found in telephone equipment) to keep the movable contacts both separated from their associated fixed contacts. In this form of our invention lifting of the hand set from its support at the subscriber's end, by closing the switch 636 and increasing what was previously a practically negligible current drain to a substantial current drain of the order of a ¼ to a ½ ampere through the microphone, results in what is in effect a substantial decreasing of the resistance across the transmission line at the subscriber's end, resulting in a substantial decrease in amplitude of the particular carrier waves involved. Since there has been no change in the resistance of the relay 528 at the corresponding central station unit, the decrease in amplitude of the voltage of the carrier waves involved results in a decreased energizing current in the actuating coil 528a, this drop in energizing current being sufficient to cause the movable contact members to drop away from the energizing coil and into contact with their associated fixed contacts, causing an indicating light to come up on the switchboard over the corresponding jack. Operation of the system is thereafter similar to that heretofore described in some detail, and when the call is completed opening of the switch 636 at the subscriber's end results in an increase in current through the energizing coil 528a of the corresponding central station unit, providing an indication on one of the cord lamps that the conversation is completed.

As was pointed out among the features of our invention in the first part of this specification, our system is adapted to also provide wired radio channels, as we developed radio or entertainment units adapted to be placed in the subscriber's home and connected to the telephone transmission line which are adapted to provide the farmer with radio entertainment without the necessity of his having a local power source for operating his own complete radio receiver. The majority of farms are still in areas having no source of commercial current available, and battery operated radio receivers involve considerable expense and trouble. In our system the radio receivers are located at the central station of the telephone company, and intermediate frequency modulated carrier waves are put out over the telephone wires, with frequencies in a range different from that used for the telephone carrier waves, with sufficient power to enable their rectification and use at the subscriber's end without any local source of power.

Referring now more particularly to Figures 7 and 8, a combined system for providing telephone service and radio entertainment will be described. The telephone portion of the system might be similar to that described in connection with Figures 1 to 4. In order to keep this portion of the specification as brief as possible reference numerals 700 higher than those applied to corresponding parts in Figure 1 will be applied to analogous parts in this description. For example, a transmission line 701 has central station units 702a, 702b, etc., connected to it in the central station; and subscriber's station units 703a, 703b, etc., connected to it at the respective subscriber's stations or local points. The central station units and subscriber's station units would be in cooperating pairs, and there would normally be 20 or more such pairs of units on any particular transmission line or local telephone circuit, although only two subscriber's station units and two central station units are illustrated here as representative. A connector unit 704 would again provide another connection, as by having its cords connected to plugs 786, and 787, which might for example be received in jacks 783 and 784 connected to central station units 702a and 702b respectively. These jacks would be mounted in conventional manner on the switchboard 708, and provided with associated indicating lamps 782a and 782b. Local source of power at the central station, as the batteries 789, 791 and 792 would provide power for operating the indicating lamps and the carrier wave generating means in the central station units. It is felt that the general construction and operation of the telephone system need not be described further here, as reference may be made to the complete description associated with Figures 1 to 4, with which this system might correspond.

In the system shown in Figure 7, we supplement the telephone system by entertainment equipment comprising a plurality of central station radio units here identified as 751 and 752, here illustrated as two in number although there would normally be from three to six such units, and a plurality of subscriber's radio units here identified as 753a, 753b, etc., there being one such unit for each subscriber desiring radio service, as for example twenty or more. The central station radio units are designed to receive radio waves and put them on the line at different or converted frequencies and in substantial power; and each subscriber's radio unit is adapted to select one such entertainment carrier wave, demodulate it, and render it audible by translating means such as a loud speaker.

It is not felt necessary to show a circuit of one of the central station radio units, as these would comprise conventional superheterodyne radio receivers without the second detector and audio amplifying portions usually present in such receivers. That is, a central station radio unit would comprise a tuned input with sufficient stages of amplification at radio frequency; a local oscillator, with a frequency fixed after initial adjustment; a first detector or mixer tube in which the radio frequency waves and local oscillator waves would be heterodyned; and an intermediate frequency amplifier of several stages, fixedly tuned in conventional manner, with a power output stage. The number of stages of amplification employed and the character of the power output stage and its preceding or driver stage should be such as to enable outputs of a hundred watts or more to be delivered to the transmission line.

If the system now being described were located in the good service range of Chicago radio stations, for example, central station radio unit No. 1 might have its radio frequency portion fixedly tuned to 670,000 cycles, the carrier frequency of station WMAQ. This wave might then be heterodyned, in the mixer tube, with a local oscillator fixed frequency wave of 495,000 cycles to provide an intermediate frequency of 175,000 cycles, which would be further amplified and delivered to the transmission line to provide one of the entertainment carriers. In similar manner central station radio unit No. 2 might have its radio frequency portion fixedly tuned to 780,000 cycles, the carrier wave frequency of station WBBM, and this might be heterodyned with a local oscillator frequency of 555,000 cycles to provide an intermediate frequency output of 225,000 cycles. It will be understood that the local oscillators would be set at any suitable frequency resulting in a substantial frequency spacing between the entertainment carriers on the transmission line. The entertainment carriers should preferably be in a different range than that to be used for the telephone communication (preferably from 150,000 cycles up), and must be much more widely spaced than the telephone carriers in order that the subscriber's radio units may be provided with selective tuning arrangements without undue complication of circuits and excessive accuracy of component values.

Referring now more particularly to Figure 8, a representative subscriber's radio unit, as the unit 753a, will be described. A coupling means, as a transformer 810, is adapted to have its primary 810a connected to the two wires of the transmission line 701, and its secondary 810b adapted to be shunted selectively by a plurality of fixed condensers, here represented by the two condensers 811 and 812, selection being adapted to be effected by the manual switch 813. The output of whichever tuned circuit is operative is developed through demodulating means here identified as 814, which should be of a type requiring no local power supply, as a copper oxide rectifier, and through translating means which may comprise a loud speaker identified as 815. In order to by-pass radio frequency currents, the voice coil of the speaker 815 is preferably shunted by a by-pass condenser 816. The speaker should also be of a type requiring no local source of power, of course, as one employing a permanent magnet to provide the field energy.

The values of the component elements of the tuned circuit in the subscriber's radio units would be so chosen as to provide selection of the entertainment carriers supplied to the transmission line by the central station radio units. For example, for the conditions previously given for a representative example, the transformer 810 might comprise an aperiodic primary and a secondary having an inductance of .4 millihenry; and might be associated with fixed condensers (fixed after initial adjustment, that is) 811 and 812 of capacities of .002 and .00125 microfarad, respectively. The by-pass condenser 816 could be of any proper capacity, as .00025 microfarad. The values given immediately above for the secondary and its associated condensers 811 and 812 would provide a parallel tuned circuit tuned to 175,000 cycles when the selector switch 813 is in the position shown in the drawing, and a circuit tuned to 225,000 cycles when the selector switch is in its alternate position. The subscriber's radio unit could be turned off, of course, by moving the selector switch to a position out of contact with any of its condenser leads. It will be understood that where the central station radio units are greater in number there will be a corresponding number of fixed condensers in the subscriber's radio units, with a corresponding number of selector switch operating points.

As will be apparent from the foregoing specification, we are here disclosing a communications system adapted to provide the highest quality telephone communication, equivalent to that of single party lines, on rural party line telephone circuits with twenty or thirty subscribers connected to a single line; to provide radio entertainment in the subscriber's home as an additional feature if desired, and to do all or part of the foregoing in a manner which requires no local source of power at the local or subscriber's stations, and which makes use of simple compact equipment at the subscriber's end requiring practically no maintenance.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. In a telephone system: a transmission line; a central station at one end of the line having therein a conventional switchboard and a plurality of units, each unit being connected to a different terminal of said board and each unit including filter means connected to the line, means coupled to said filter means for supplying carrier waves to said line, and modulating and demodulating means coupled to the line through said filter means, the carrier wave supplying means and filters in each unit being tuned to a different frequency; and a plurality of subscribers units connected to said transmission line at points spaced from the central station, each such unit including a filter connected to the line, a microphone, a receiver, rectifying means for rectifying a portion of said carrier waves to provide a D. C. energizing supply for said microphone, a circuit connecting the input of said rectifying means to said line through said last mentioned filter, a circuit connecting the output of said rectifying means to said microphone, and means coupled to said line through said last mentioned filter and coupled to said microphone for modulating carrier waves on the line by voice waves generated by the microphone, the rectifying means and modulating means both being self-operable and the filters in each unit being tuned to a different frequency corresponding to that of one of the central station units.

2. In a telephone system: a transmission line; a central station at one end of the line having therein a plurality of units each including filter means connected to the line, means coupled to said filter means for supplying carrier waves to said line, and modulating and demodulating means coupled to the line through said filter means, the carrier wave supplying means and filters in each unit being tuned to a different frequency; and a plurality of subscribers units connected to said transmission line at points spaced from the central station, each such unit including a filter, a microphone, a receiver, self operable rectifying means for rectifying a portion of said carrier waves to provide a D. C. energizing supply for said microphone, a circuit connecting the input of said rectifying means to said line through said last mentioned filter, a circuit connecting the output of said rectifying means to said microphone, and means coupled to said line through said last mentioned filter and coupled to said microphone for modulating carrier waves on the line by voice waves generated by the microphone, the filters in each unit being tuned to a different frequency corresponding to that of one of the central station units.

3. In a telephone system: a transmission line; a central station at one end of the line having therein telephone equipment including means for supplying to said line a plurality of carrier waves of different frequencies; and a plurality of subscriber's units connected to said transmission line at points spaced from the central station, each such unit including a filter connected to said line, a microphone, a receiver, rectifying means for rectifying a portion of said carrier waves to provide a D. C. energizing supply for said microphone, a circuit connecting the input of said rectifying means to said line through said filter, a circuit connecting the output of said rectifying means to said microphone, and a dry-plate diamond-connected modulator-demodulator device coupled to said line through said filter and coupled to said microphone and receiver for modulating carrier waves on the line by voice waves generated by the microphone and for demodulating carrier waves on the line for actuating said receiver, the filters in each unit being tuned to a different frequency.

4. In a telephone system: a transmission line; a central station at one end of the line having therein telephone equipment including means for supplying to said line a plurality of carrier waves of different frequencies; and a plurality of subscriber's units connected to said transmission line at points spaced from the central station, each such unit including a filter connected to said line, a microphone, a receiver, cold rectifying means for rectifying a portion of said carrier waves to provide a D. C. energizing supply for said microphone, a circuit connecting the input of said rectifying means to said line through said filter, a circuit connecting the output of said rectifying means to said microphone, and self operable means coupled to said line through said filter and coupled to said microphone for modulating carrier waves on the line by voice waves generated by the microphone, the filters in each unit being tuned to a different frequency.

5. Apparatus of the character claimed in claim 4, wherein the rectifying means and the modulating means both comprise dry-plate diamond-connected apparatus.

6. In a telephone system: a transmission line, means at one end of said line for supplying carrier waves to said line; and telephone equipment connected to said line at a point spaced from said end, this equipment including a microphone, a receiver, switch means for supporting at least said receiver and movable between on and off positions in accordance with whether or not such switch means supports said receiver, cold rectifying means for rectifying a portion of said carrier waves to provide a D. C. energizing supply for said microphone, a circuit connecting the input of said rectifying means to said line, a circuit connecting the output of said rectifying means to said microphone, one of said rectifier connections being through said switch means, and self operable means coupled to said line and to said microphone for modulating carrier waves on the line by voice waves generated by the microphone.

7. Apparatus of the character claimed in claim 6, wherein the rectifying means and the modulating means both comprise dry-plate diamond-connected apparatus.

8. In a telephone system: a transmission line; means at one end of said line for supplying carrier waves to said line; and telephone equipment connected to said line at a point spaced from said end, this equipment including a microphone, cold rectifying means for rectifying a portion of said carrier waves to provide a D. C. energizing supply for said microphone, a circuit connecting the input of said rectifying means to said line, and a circuit connecting the output of said rectifying means to said microphone.

9. In a telephone system: a transmission line; means at one end of said line for supplying carrier waves to said line; and telephone equipment connected to said line at a point spaced from said end, this equipment including a microphone, a receiver, switch means for supporting at least said receiver and movable between on and off positions in accordance with whether or not such switch means supports said receiver, and rectifying means having its input connected to said line and its output connected to said microphone, one of said rectified connections being through said switch means for rectifying a portion of said carrier waves to provide a D. C. energizing supply for said microphone when said switch means is in on position.

10. In a telephone system: a transmission line; a central station at one end of the line having therein a plurality of units each including filter means connected to said line, means for supplying carrier waves through said filter means to said line, modulating and demodulating means coupled to said line through said filter means, the carrier wave supply means and filters in each unit being tuned to a different frequency, indicating means, and actuating means for said indicating means; and a plurality of subscriber's units connected to said transmission line, each such unit including a filter connected to the line, a microphone, a receiver, switch means for supporting at least said receiver and movable between on and off positions in accordance with whether or not it supports said receiver, and rectifying means having its input connected to said line through said last mentioned filter and its output connected to said microphone, one of said rectifier connections being through said switch means for rectifying a portion of said carrier waves to provide a D. C. energizing supply for said microphone when said switch means in on position, movement of said switch means varying an impedance condition of said line to effect operation of said actuating means.

11. In a telephone system: a transmission line; telephone equipment at one end of the line including means for supplying carrier waves to said line, indicating means, and actuating means for said indicating means; and telephone equipment indirectly connected to said line at a point spaced from said end, this equipment including a microphone, a receiver, and circuits coupling said microphone and receiver to said line, said circuits including switch means supporting at least said receiver and movable between on and off positions in accordance with whether or not it supports said receiver, an impedance connected to said switch means, and means including said impedance whereby the movement of said switch means varies the effective inductance of said line to effect operation of said actuating means.

12. In a telephone system: a transmission line; telephone equipment at one end of the line including means for supplying carrier waves to said line, indicating means, and actuating means for said indicating means; and telephone equipment connected to said line at a point spaced from said end, this equipment including a microphone, a receiver, and circuits coupling said microphone and receiver to said line, said circuits including switch means for supporting at least said receiver and movable between on and off positions in accordance with whether or not it supports said receiver, an impedance connected to said switch means, and means including said impedance whereby the movement of said switch means affects a condition of said line to effect operation of said actuating means.

13. In a telephone system: a transmission line; telephone equipment at one end of the line including means for supplying carrier waves to said line, indicating means, and actuating means for said indicating means; and telephone equipment connected to said line at a point spaced from said end, this equipment including a microphone, a receiver, and circuits coupling said microphone and receiver to said line, said circuits including switch means for supporting at least said receiver and movable between on and off positions in accordance with whether or not it supports said receiver, an impedance connected to said switch means, and means including said impedance whereby the movement of said switch means varies an impedance condition of said line to effect operation of said actuating means.

14. In a telephone system: a transmission line; telephone equipment at one end of the line including means for continuously supplying carrier waves to said line, indicating means, and a relay for actuating said indicating means, this relay having its actuating coil permanently connected to said line; and telephone equipment indirectly connected to said line at a point spaced from said end, this equipment including a microphone, a receiver, and circuits coupling said microphone and receiver to said line, and circuits including switch means for supporting at least said receiver and movable between on and off positions in accordance with whether or not it supports said receiver, an inductance connected to said switch means and coupled to said line, and means including said inductance whereby the movement of said switch means varies the effective inductance of said line so said line is resonant at the frequency to which said telephone equipment is tuned when the receiver thereof is removed from the switch means and not resonant thereto when said switch means is supporting the receiver, the circulating currents being high enough under resonant conditions to energize said relay but not sufficient to energize it under non-resonant conditions.

15. In a telephone system: a transmission line; telephone equipment at one end of the line including means for supplying carrier waves to said line, indicating means, and actuating means for said indicating means; and telephone equipment indirectly connected to said line at a point spaced from said end, this equipment including a microphone, a receiver, and circuits coupling said microphone and receiver to said line, said circuits including switch means for supporting at least said receiver and movable between on and off positions in accordance with whether or not it supports said receiver, an inductance connected to said switch means and coupled to said line, and means including said inductance whereby the movement of said switch means varies the effective inductance of said line to effect operation of said actuating means so that said line is resonant at the frequency to which said telephone equipment is tuned when the receiver thereof is removed from the switch means and not resonant thereto when said switch means is supporting the receiver.

16. Telephone equipment for use with a transmission line supplied with carrier waves, including: a filter connected to said line; a microphone, a receiver, a circuit connecting said microphone to said filter, said circuit including switch means and self operable rectifying means; self operable modulator-demodulator means; a circuit coupling said modulator-demodulator means to said filter; and coupling means having three windings, one being connected to the receiver, one to the microphone and rectifying means in series, and one to the modulator-demodulator means.

17. Apparatus of the character claimed in claim 16, wherein the winding of the coupling means which is connected to the microphone and rectifying means is of much lower impedance than the winding connected to the receiver.

18. Telephone equipment for use with a transmission line supplied with carrier waves, including: a filter connected to said line; a microphone; a receiver; switch means; modulator-demodulator means coupled to said filter; rectifying means having its input coupled to said filter through said switch and its output connected to said microphone for providing a D. C. energizing supply for said microphone, said modulator-demodulator means and rectifying means both being self operable; and coupling means having three windings, one being connected to the receiver, one to the microphone, and one to the modulator-demodulator means.

19. Telephone equipment for use with a transmission line supplied with carrier waves, including: a filter connected to said line; a microphone; a receiver; switch means; modulator-demodulator means connected to said receiver on the one hand and through said filter to said line on the other hand; and cold rectifying means for rectifying a portion of said carrier waves to provide a D. C. energizing supply for said microphone, said rectifying means having its input connected to said line through said filter and its output connected to said microphone, one of said rectifier connections including said switch means, and both said modulator-demodulator means and said rectifying means being self operable.

20. Telephone equipment for use with a transmission line supplied with carrier waves, including: a filter connected to said line; a microphone; switch means; self operable modulator-demodulator means coupled to said filter; and cold rectifying means having its input coupled to said filter through said switch and its output connected to said microphone for providing a D. C. energizing supply for said microphone.

WILLIAM C. DILLON.
CLARENCE H. KEHM.

REFERENCES CITED

The following references are of record in the file of this patent:

UNITED STATES PATENTS

| Number | Name | Date |
|---|---|---|
| 1,606,446 | Ray | Nov. 9, 1926 |
| 1,633,082 | Espenschied | June 21, 1927 |
| 1,662,966 | Foley | Mar. 20, 1928 |
| 1,754,878 | Clement | Apr. 15, 1930 |
| 1,905,193 | Trogner | Apr. 25, 1933 |
| 2,009,438 | Dudley | July 30, 1935 |
| 2,064,907 | Green | Dec. 22, 1936 |
| 2,108,909 | Vincent | Feb. 22, 1938 |
| 2,117,721 | Hornickel | May 17, 1938 |
| 2,221,994 | Parker | Nov. 19, 1940 |
| 2,264,396 | Moore | Dec. 2, 1941 |
| 2,289,048 | Sandalls | July 7, 1942 |
| 2,327,711 | Holden | Aug. 24, 1943 |
| 2,337,878 | Espenschied | Dec. 28, 1943 |

FOREIGN PATENTS

| Number | Country | Date |
|---|---|---|
| 19,777 | Australia | 1934 |